United States Patent
Tsao

(10) Patent No.: US 8,843,709 B2
(45) Date of Patent: Sep. 23, 2014

(54) METHOD AND APPARATUS FOR PERFORMING DYNAMIC CONFIGURATION

(75) Inventor: You-Ming Tsao, Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 223 days.

(21) Appl. No.: 13/403,992

(22) Filed: Feb. 24, 2012

(65) Prior Publication Data
US 2013/0138890 A1    May 30, 2013

Related U.S. Application Data

(60) Provisional application No. 61/563,843, filed on Nov. 28, 2011.

(51) Int. Cl.
G06F 12/08 (2006.01)
G06F 13/16 (2006.01)

(52) U.S. Cl.
USPC ............ 711/129; 711/130; 711/173; 711/118

(58) Field of Classification Search
CPC ............ G06F 12/0866; G06F 12/0848; G06F 12/0864; G06F 12/0842; G06F 12/084; G06F 12/0806; G06F 2212/601
USPC ........................................................ 711/129
See application file for complete search history.

(56) References Cited

U.S. PATENT DOCUMENTS

| | | | |
|---|---|---|---|
| 6,836,824 B1 * | 12/2004 | Mirov et al. | 711/118 |
| 2003/0056075 A1 * | 3/2003 | Schmisseur et al. | 711/173 |
| 2006/0168390 A1 * | 7/2006 | Speier et al. | 711/5 |
| 2006/0277365 A1 * | 12/2006 | Pong | 711/128 |

* cited by examiner

*Primary Examiner* — Charles Rones
*Assistant Examiner* — Andrew Russell
(74) *Attorney, Agent, or Firm* — Winston Hsu; Scott Margo

(57) ABSTRACT

A method for performing dynamic configuration includes: freezing a bus between a dynamic configurable cache and a plurality of cores/processors by rejecting a request from any of the cores/processors during a bus freeze period, wherein the dynamic configurable cache is implemented with an on-chip memory; and adjusting a size of a portion of the dynamic configurable cache, wherein the portion of the dynamic configurable cache is capable of caching/storing information for one of the cores/processors. An associated apparatus is also provided. In particular, the apparatus includes the plurality of cores/processors, the dynamic configurable cache, and a dynamic configurable cache controller, and can operate according to the method.

22 Claims, 8 Drawing Sheets

# METHOD AND APPARATUS FOR PERFORMING DYNAMIC CONFIGURATION

CROSS REFERENCE TO RELATED APPLICATIONS

This application claims the benefit of U.S. Provisional Application No. 61/563,843, which was filed on Nov. 28, 2011 and is entitled "METHOD AND APPARATUS FOR PERFORMING DYNAMIC CONFIGURATION", and is included herein by reference.

BACKGROUND

The present invention relates to cache control of an electronic device, and more particularly, to a method for performing dynamic configuration, and to an associated apparatus.

According to the related art, calculation capability/power of a processor in a portable electronic device such as a mobile phone (e.g. a multifunctional mobile phone), a personal digital assistant (PDA), a tablet or a laptop is typically limited due to a goal of saving the associated costs of the portable electronic device. Suppose that saving costs is not the issue under consideration, end users may be willing to own a portable electronic device equipped with a processor having higher capability/power in the future. However, some problems may occur. For example, the conventional system architecture of the related art is simple and may not be able to support a multi-core processor, while the compact requirement of the portable electronic device should not be omitted. In another example, the conventional system architecture of the related art may be too simple to support multiple processors, while meeting with the compact requirement of the portable electronic device is still a must. Thus, a novel method is required for implementing a portable electronic device equipped with a processor having higher capability/power.

SUMMARY

It is therefore an objective of the claimed invention to provide a method for performing dynamic configuration, and to provide an associated apparatus, in order to solve the above-mentioned problems.

An exemplary embodiment of a method for performing dynamic configuration comprises: freezing a bus between a dynamic configurable cache and a plurality of cores/processors by rejecting a request from any of the cores/processors during a bus freeze period, wherein the dynamic configurable cache is implemented with an on-chip memory; and adjusting a size of a portion of the dynamic configurable cache, wherein the portion of the dynamic configurable cache is capable of caching/storing information for one of the cores/processors.

An exemplary embodiment of an apparatus for performing dynamic configuration comprises a plurality of cores/processors, a dynamic configurable cache, and a dynamic configurable cache controller. The plurality of cores/processors is capable of performing operations of the apparatus. In addition, the dynamic configurable cache is capable of caching/storing information for the cores/processors, wherein the dynamic configurable cache is implemented with an on-chip memory. Additionally, the dynamic configurable cache controller is capable of freezing a bus between the dynamic configurable cache and the plurality of cores/processors by rejecting a request from any of the cores/processors during a bus freeze period, and adjusting a size of a portion of the dynamic configurable cache.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
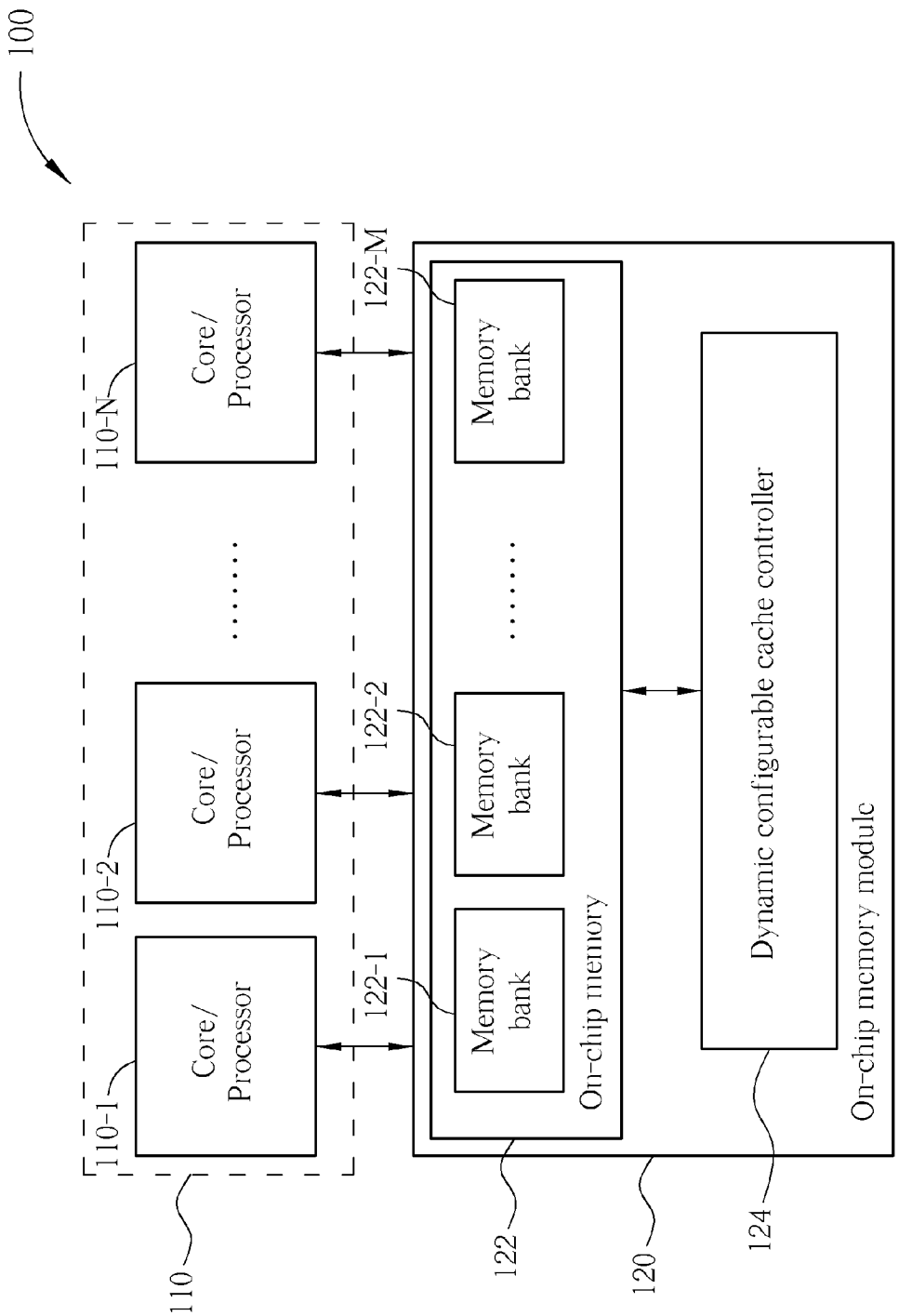
FIG. 1 is a diagram of an apparatus for performing dynamic configuration according to a first embodiment of the present invention.

Please refer to FIG. 1, which illustrates an apparatus 100 for performing dynamic configuration according to a first embodiment of the present invention. According to different embodiments, such as the first embodiment and some variations thereof, the apparatus 100 may comprise at least one portion (e.g. a portion or all) of an electronic device. For example, the apparatus 100 may comprise a portion of the electronic device mentioned above, and more particularly, can be a control circuit such as an integrated circuit (IC) within the electronic device. In another example, the apparatus 100 can be the whole of the electronic device mentioned above. Examples of the electronic device may include, but not limited to, a mobile phone (e.g. a multifunctional mobile phone), a personal digital assistant (PDA), a portable electronic device such as the so-called tablet (based on a generalized definition), and a personal computer such as a laptop computer or desktop computer.

As shown in FIG. 1, the apparatus 100 can comprise a plurality of cores/processors 110 comprising the cores/processors 110-1, 110-2, ..., and 110-N and can further comprise an on-chip memory module 120. The on-chip memory module 120 can comprise an on-chip memory 122 such as a static random access memory (SRAM) and a dynamic configurable cache controller 124, where the on-chip memory 122 can comprise a plurality of memory banks 122-1, 122-2, ..., and 122-M. The cores/processors 110-1, 110-2, ..., and 110-N are capable of performing operations of the apparatus 100. For example, at least one portion (e.g. a portion or all) of the cores/processors 110-1, 110-2, ..., and 110-N can be core(s) within one or more processors that perform operations of the apparatus 100, respectively. In another example, at least one portion (e.g. a portion or all) of the cores/processors 110-1, 110-2, ..., and 110-N can be one or more processors that perform operations of the apparatus 100, respectively. Please note that, according to different embodiments, such as the first embodiment and some variations thereof, the core/processor 110-1, 110-2, ..., and 110-N may comprise one or more central processing units (CPUs), one or more graphic processing units (GPUs), one or more digital signal processors (DSPs), one or more video coder-decoders (CODECs), and/or one or more audio CODECs.

Figure 2:
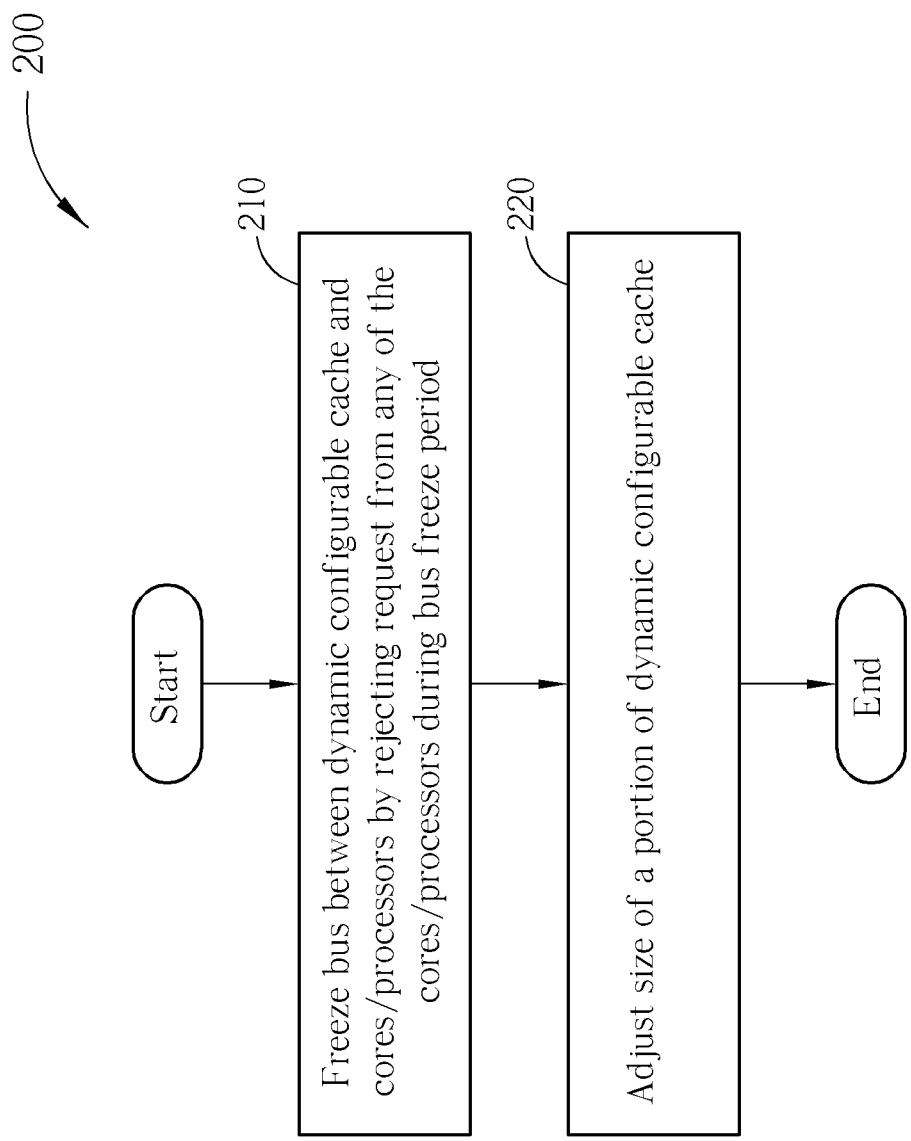
FIG. 2 illustrates a flowchart of a method for performing dynamic configuration according to an embodiment of the present invention.

According to the first embodiment, the apparatus 100 may comprise a dynamic configurable cache, where the dynamic configurable cache can be implemented with an on-chip memory such as the on-chip memory 122 shown in FIG. 1. The dynamic configurable cache is capable of caching/storing information for the cores/processors 110-1, 110-2, ..., and 110-N. In addition, the dynamic configurable cache controller 124 is capable of controlling operations of the on-chip memory 122, in order to control configurations of the dynamic configurable cache mentioned above. Please note that the architecture disclosed above can be regarded as dynamic configurable cache architecture (DCCA). Referring to FIG. 2, related details of DCCA operations are further described as follows.

FIG. 2 illustrates a flowchart of a method 200 for performing dynamic configuration according to an embodiment of the present invention. The method 200 can be applied to the apparatus 100 shown in FIG. 1, and more particularly, the dynamic configurable cache controller 124 mentioned above.

In Step 210, the dynamic configurable cache controller 124 can freeze a bus between the dynamic configurable cache mentioned above and the plurality of cores/processors 110, such as the cores/processors 110-1, 110-2, ..., and 110-N in this embodiment, by rejecting a request from any of the cores/processors 110-1, 110-2, ..., and 110-N during a bus freeze period, where the dynamic configurable cache can be implemented with the on-chip memory 122. The dynamic configurable cache controller 124 can reject the request from any of the cores/processors 110-1, 110-2, ..., and 110-N during the bus freeze period, rather than rejecting any request all the time. That is, the dynamic configurable cache controller 124 can temporarily freeze the bus during the bus freeze period, rather than freezing the bus all the time.

In Step 220, the dynamic configurable cache controller 124 can adjust the size of a portion of the dynamic configurable cache, where the portion of the dynamic configurable cache is capable of caching/storing information for one of the cores/processors 110-1, 110-2, ..., and 110-N. In some embodiments, the portion of the dynamic configurable cache may comprise at least one memory bank of the memory banks 122-1, 122-2, ..., and 122-M.

According to this embodiment, the dynamic configurable cache controller 124 can freeze the bus in response to a request from a core/processor of the cores/processors 110-1, 110-2, ..., and 110-N. For example, the request may ask for allocating a memory space of the dynamic configurable cache for the core/processor submitting the request. In another example, the request may ask for allocating an additional space of the dynamic configurable cache for the core/processor submitting the request. As the need for the memory space/additional space may be temporary, the dynamic configurable cache controller 124 can re-freeze the bus in response to a notification from the core/processor submitting the request, in order to free the memory space/additional space, where the notification typically indicates that the memory space/additional space is not required. In addition, for some embodiments, the dynamic configurable cache controller 124 can control the beginning of the bus freeze period to be aligned to a time point of frame change (e.g. the change from one frame to another), in order to achieve the goal of maintaining/improving the overall performance of the apparatus 100. This is for illustrative purposes only, and is not meant to be a limitation of the present invention. According to a variation of this embodiment, the dynamic configurable cache controller 124 may control the beginning of the bus freeze period to be delayed for a predetermined delay amount, in order to achieve the goal of maintaining/improving the overall performance of the apparatus 100. According to another variation of this embodiment, the dynamic configurable cache controller 124 may trigger a delay counter to start counting when the request is received, and utilize the delay counter to delay the beginning of the bus freeze period with a predetermined delay amount, in order to achieve the goal of maintaining/improving the overall performance of the apparatus 100. In some embodiments, after an operation of adjusting the size of the portion of the dynamic configurable cache is completed, the dynamic configurable cache controller 124 can control the bus freeze period to come to an end.

In some embodiments, no matter whether the beginning of the bus freeze period is controlled according to this embodiment or any of the variations thereof, the dynamic configurable cache controller 124 can dynamically control the beginning of the bus freeze period. Therefore in some embodiments, the dynamic configurable cache controller 124 can determine the timing of switching between different configurations of the dynamic configurable cache mentioned above in run time.

Regarding the usage of the portion of the dynamic configurable cache, it may vary in different situations. For example, the portion of the dynamic configurable cache can be temporarily utilized as a cache. In another example, the portion of the dynamic configurable cache can be temporarily utilized as a scratch pad memory. As the usage of the portion of the dynamic configurable cache is flexible, the dynamic configurable cache controller 124 can dynamically control the configurations of the dynamic configurable cache when needed. As a result, the goal of maintaining/improving the overall performance of the apparatus 100 can be achieved.

Figure 3:
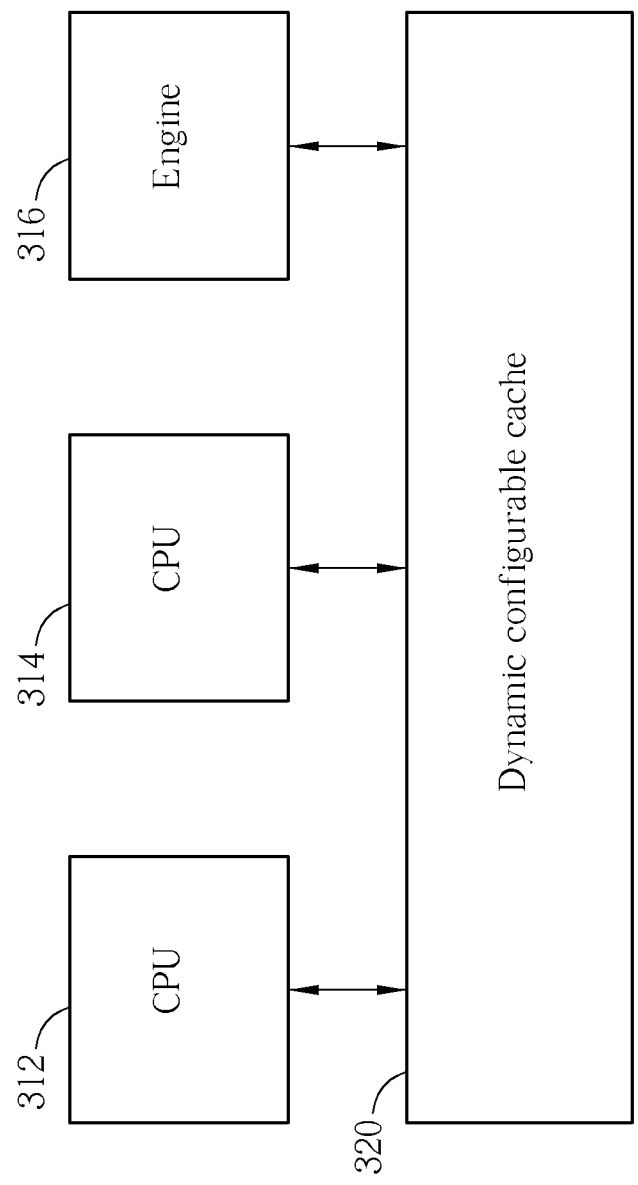
FIG. 3 illustrates a dynamic configuration scheme involved with the method shown in FIG. 2 according to a second embodiment of the present invention.

FIG. 3 illustrates a dynamic configuration scheme involved with the method 200 shown in FIG. 2 according to a second embodiment of the present invention, where the numeral 320 is utilized for representing the dynamic configurable cache mentioned above. In this embodiment, two CPUs 312 and 314 and an engine 316 such as a multimedia (MM) processing engine are taken as examples of the plurality of cores/processors 110 mentioned in Step 210. The MM processing engine may include a video CODEC, an audio CODEC, etc.

According to this embodiment, the dynamic configurable cache 320 can be utilized by the CPUs 312 and 314 and the engine 316, respectively. For example, any of the CPUs 312 and 314 can utilize a portion of the dynamic configurable cache 320 (e.g. the portion mentioned in Step 220) as a cache, and more particularly, a level two (L2) cache. In another example, the engine 316 such as the aforementioned MM processing engine can utilize a portion of the dynamic configurable cache 320 (e.g. the portion mentioned in Step 220) as a scratch pad memory. As a result of the adjustment implemented by utilizing the method 200, the size of the cache utilized by any of the CPUs 312 and 314 and/or the size of the scratch pad memory utilized by the engine 316 can be properly arranged.

In particular, when the engine 316 needs a memory space/additional space such as that mentioned above and sends a request (e.g. the request mentioned above) to ask for the memory space/additional space, the dynamic configurable cache controller 124 can provide the engine 316 with the memory space/additional space by temporarily allocate a space such as one or more memory banks (e.g. one or more of the memory banks 122-1, 122-2, . . . , and 122-M mentioned above) for the engine 316. For example, the one or more memory banks may originally be utilized by one of the CPUs 312 and 314, and is now re-arranged to be utilized by the engine 316. In another example, the one or more memory banks may originally be unused, and is now arranged to be utilized by the engine 316. When it is detected that the engine 316 does not require the memory space/additional space (e.g. the engine 316 sends a notification such as that mentioned above), the dynamic configurable cache controller 124 is capable of re-freezing the bus to rearrange/free the memory space/additional space that has temporarily been utilized by the engine 316. For example, the dynamic configurable cache controller 124 may rearrange the one or more memory banks to be utilized by the one of the CPUs 312 and 314 again or to be unused again.

Figure 4:
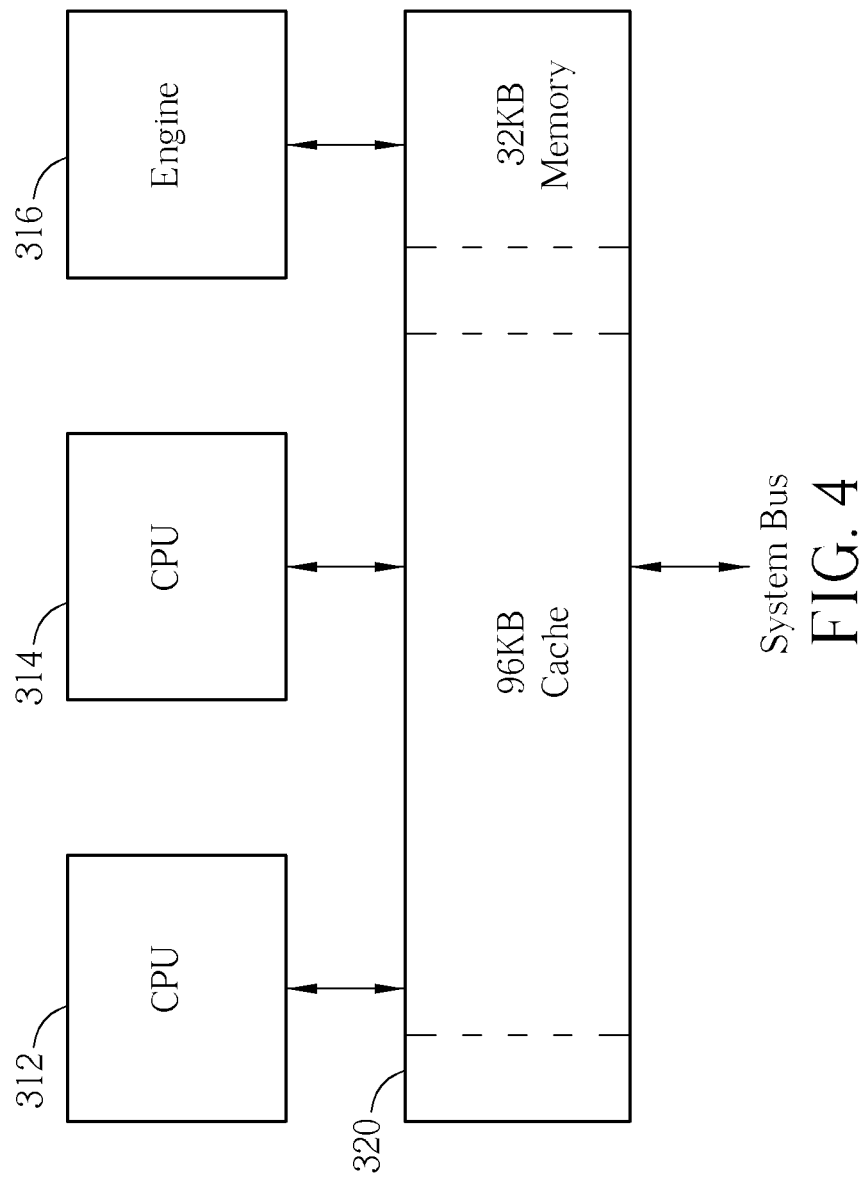
FIG. 4 illustrates a configuration of the dynamic configurable cache shown in FIG. 3 according to an embodiment of the present invention.

FIG. 4 illustrates a configuration of the dynamic configurable cache 320 shown in FIG. 3 according to an embodiment of the present invention. For example, as a result of the adjustment implemented by utilizing the method 200, the size of the cache utilized by the CPUs 312 and 314 is equal to 96 KB (kilobytes), and the size of the scratch pad memory utilized by the engine 316 is equal to 32 KB. Thus, the cache utilized by the CPUs 312 and 314 is labeled "96 KB Cache", and the scratch pad memory utilized by the engine 316 is labeled "32 KB Memory". In some embodiments, the CPUs 312 and 314 can access the cache such as the 96 KB Cache first, in order to find the data in need. In a situation where the data in need cannot be found in the 96 KB Cache, the CPUs 312 and 314 can access an external memory such as a dynamic random access memory (DRAM) through a system bus.

Figure 5:
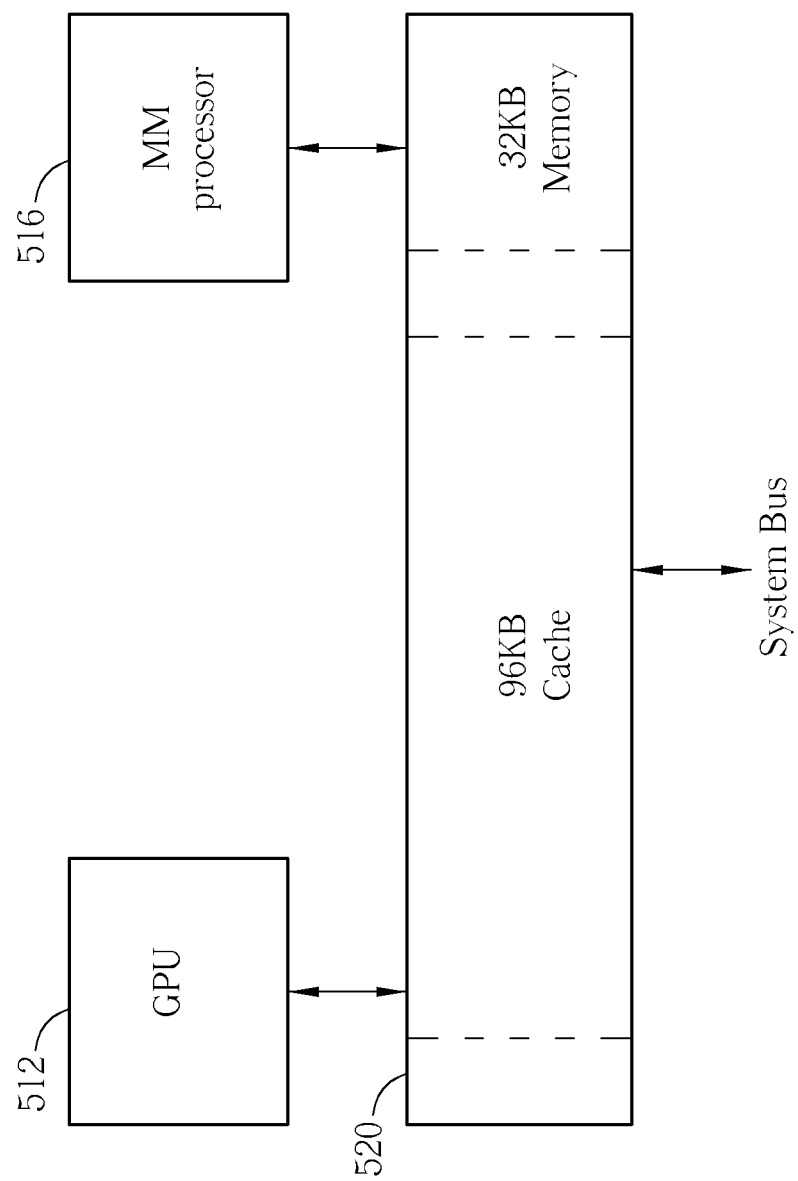
FIG. 5 illustrates a dynamic configuration scheme involved with the method shown in FIG. 2 according to a third embodiment of the present invention.

FIG. 5 illustrates a dynamic configuration scheme involved with the method 200 shown in FIG. 2 according to a third embodiment of the present invention, where the numeral 520 is utilized for representing the dynamic configurable cache mentioned above. In this embodiment, a GPU 512 and an MM processor 516 are taken as examples of the plurality of cores/processors 110 mentioned in Step 210.

According to this embodiment, the dynamic configurable cache 520 can be utilized by the GPU 512 and the MM processor 516, respectively. For example, the GPU 512 can utilize a portion of the dynamic configurable cache 520 (e.g. the portion mentioned in Step 220) as a cache. In another example, the MM processor 516 such as the aforementioned MM processing engine can utilize a portion of the dynamic configurable cache 520 (e.g. the portion mentioned in Step 220) as a scratch pad memory. As a result of the adjustment implemented by utilizing the method 200, the size of the cache utilized by the GPU 512 and/or the size of the scratch pad memory utilized by the MM processor 516 can be properly arranged.

Please note that FIG. 5 illustrates a first configuration of the dynamic configurable cache 520 before the adjustment mentioned above. According to this configuration, the size of the cache utilized by the GPU 512 is equal to 96 KB, and the size of the scratch pad memory utilized by the MM processor 516 is equal to 32 KB. Thus, the cache utilized by the GPU 512 is labeled "96 KB Cache", and the scratch pad memory utilized by the MM processor 516 is labeled "32 KB Memory". When the MM processor 516 needs a memory space/additional space such as that mentioned above and sends a request (e.g. the request mentioned above) to ask for the memory space/additional space, the dynamic configurable cache controller 124 can provide the MM processor 516 with the memory space/additional space by temporarily allocate a space such as one or more memory banks (e.g. one or more of the memory banks 122-1, 122-2, . . . , and 122-M mentioned above) for the MM processor 516. For example, the one or more memory bank may originally be utilized by the GPU 512, and is now re-arranged to be utilized by the MM processor 516 based upon an arrangement such as that illustrated in FIG. 6.

Figure 6:
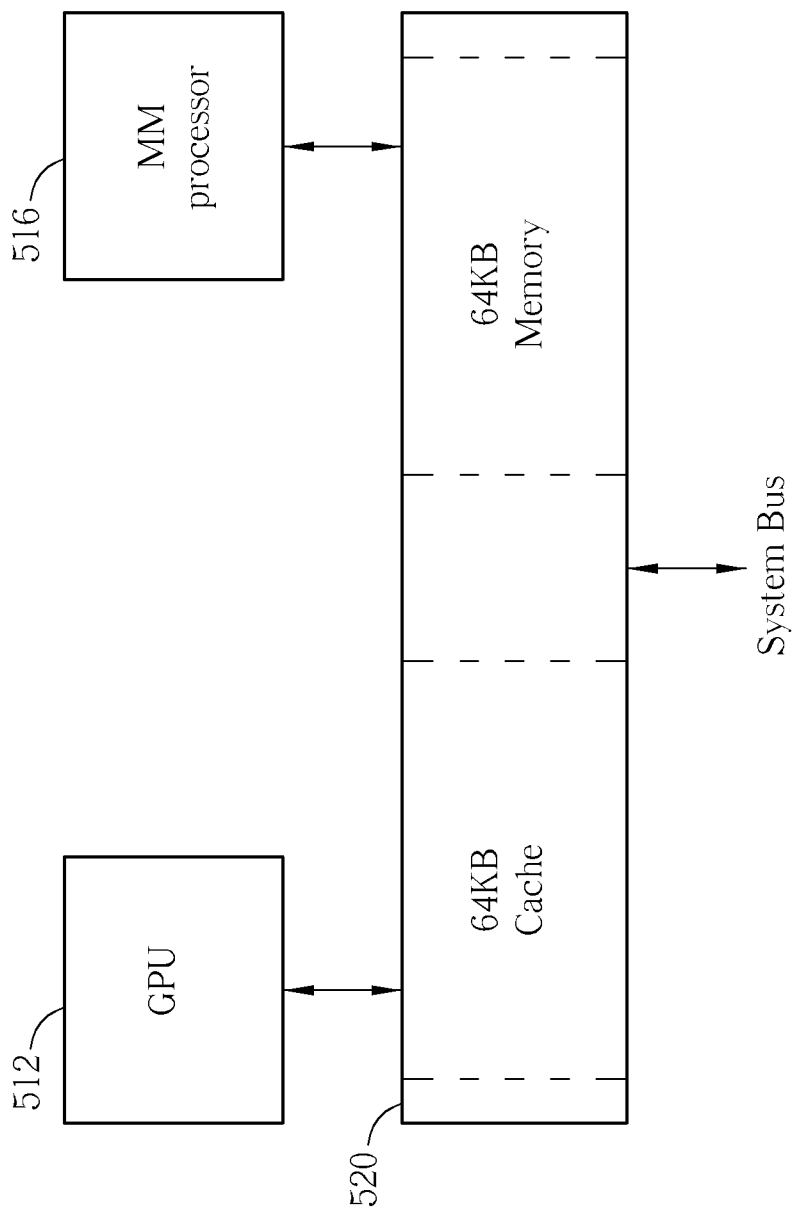
FIG. 6 illustrates a configuration of the dynamic configurable cache shown in FIG. 5 according to an embodiment of the present invention.

FIG. 6 illustrates another configuration of the dynamic configurable cache 520 shown in FIG. 5 according to an embodiment of the present invention. For example, as a result of the adjustment implemented by utilizing the method 200, the size of the cache utilized by the GPU 512 is equal to 64 KB, and the size of the scratch pad memory utilized by the MM processor 516 is equal to 64 KB. Thus, the cache utilized by the GPU 512 is labeled "64 KB Cache", and the scratch pad memory utilized by the MM processor 516 is labeled "64 KB Memory". Similarly, when it is detected that the MM processor 516 does not require the memory space/additional space (e.g. the MM processor 516 sends a notification such as that mentioned above), the dynamic configurable cache controller 124 is capable of re-freezing the bus to rearrange/free the memory space/additional space that has temporarily been utilized by the MM processor 516. For example, the dynamic configurable cache controller 124 may rearrange the one or more memory bank to be utilized by the GPU 512 again or to be unused. As a result, the first configuration mentioned above can be re-applied to the dynamic configurable cache 520.

Figure 7:
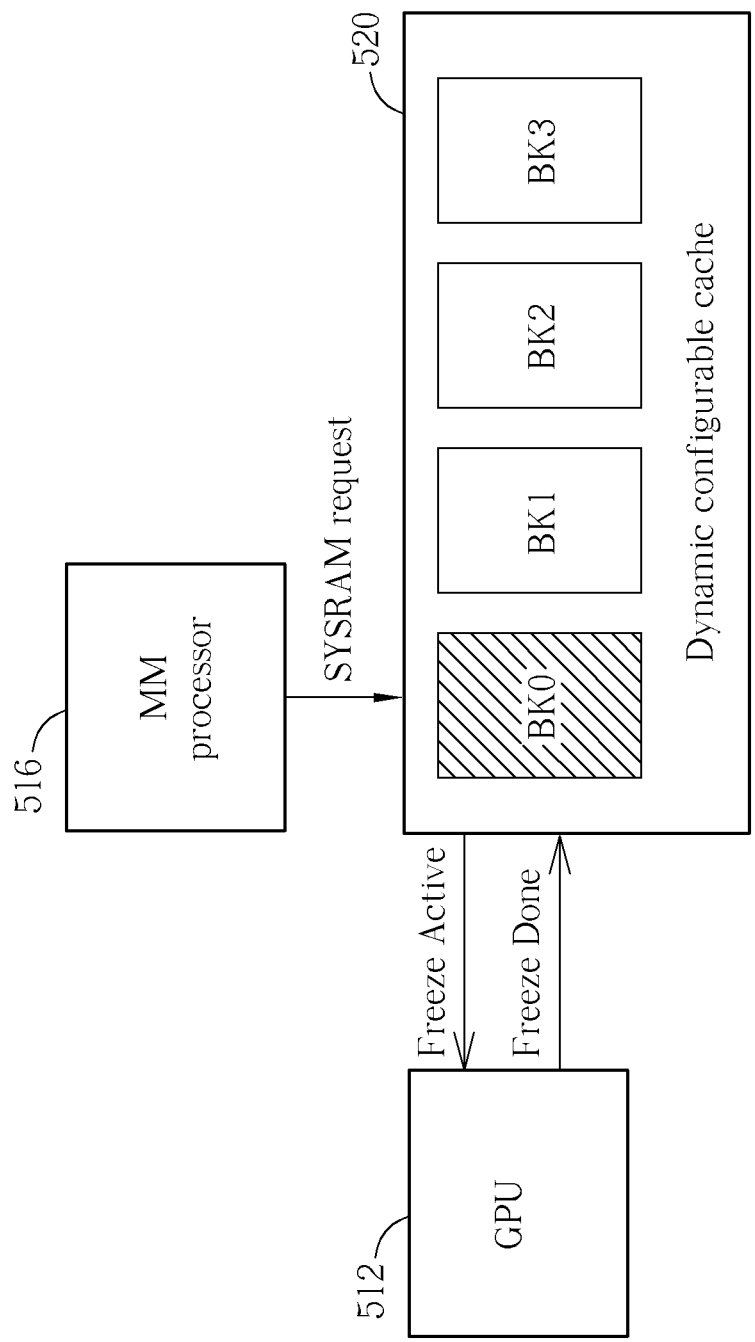
FIG. 7 illustrates a core/processor protection configuration of the dynamic configurable cache shown in FIG. 5 according to another embodiment of the present invention.

FIG. 7 illustrates a core/processor protection configuration of the dynamic configurable cache 520 shown in FIG. 5 according to another embodiment of the present invention, where the dynamic configurable cache controller 124 of this embodiment is integrated into the dynamic configurable cache 520. In a situation where the number M of memory banks within the on-chip memory 122 is equal to four, the notations BK0, BK1, BK2, and BK3 can be capable of representing the memory banks 122-1, 122-2, . . . , and 122-M mentioned above (more particularly, the memory banks 122-1, 122-2, 122-3, and 122-4), respectively.

According to this embodiment, a system random access memory (SYSRAM) request is taken as an example of the request mentioned above. In response to the SYSRAM request, the dynamic configurable cache controller 124 is capable of controlling the bus to be frozen during the bus freeze period. The dynamic configurable cache controller 124 in the dynamic configurable cache 520 of this embodiment may send a freeze active notification (labeled "Freeze Active" in FIG. 7) to the GPU 512, in order to notify the GPU 512 of entering the bus freeze period, where the GPU 512 may send a freeze done notification (labeled "Freeze Done" in FIG. 7) as a response to the freeze active notification.

In this embodiment, based upon the core/processor protection configuration, the memory bank BK0 is dedicated to the GPU 512, and cannot be used by the MM processor 516. That is, the memory bank BK0 is a GPU-dedicated memory bank, while any of the memory banks BK1, BK2, and BK3 can be shared by the GPU 512 and the MM processor 516, and more particularly, utilized by one of the GPU 512 and the MM processor 516 at a time. In a situation where the size of each of the memory banks BK0, BK1, BK2, and BK3 is equal to 32 KB, the size of the cache utilized by the GPU 512 can be greater than or equal to 32 KB, and the size of the scratch pad memory utilized by the MM processor 516 can be less than or equal to 96 KB. Thus, the core/processor protection configuration can prevent degradation of the performance of the GPU 512 by providing the GPU 512 with the GPU-dedicated memory bank. Similar descriptions are not repeated in detail for this embodiment.

Figure 8:
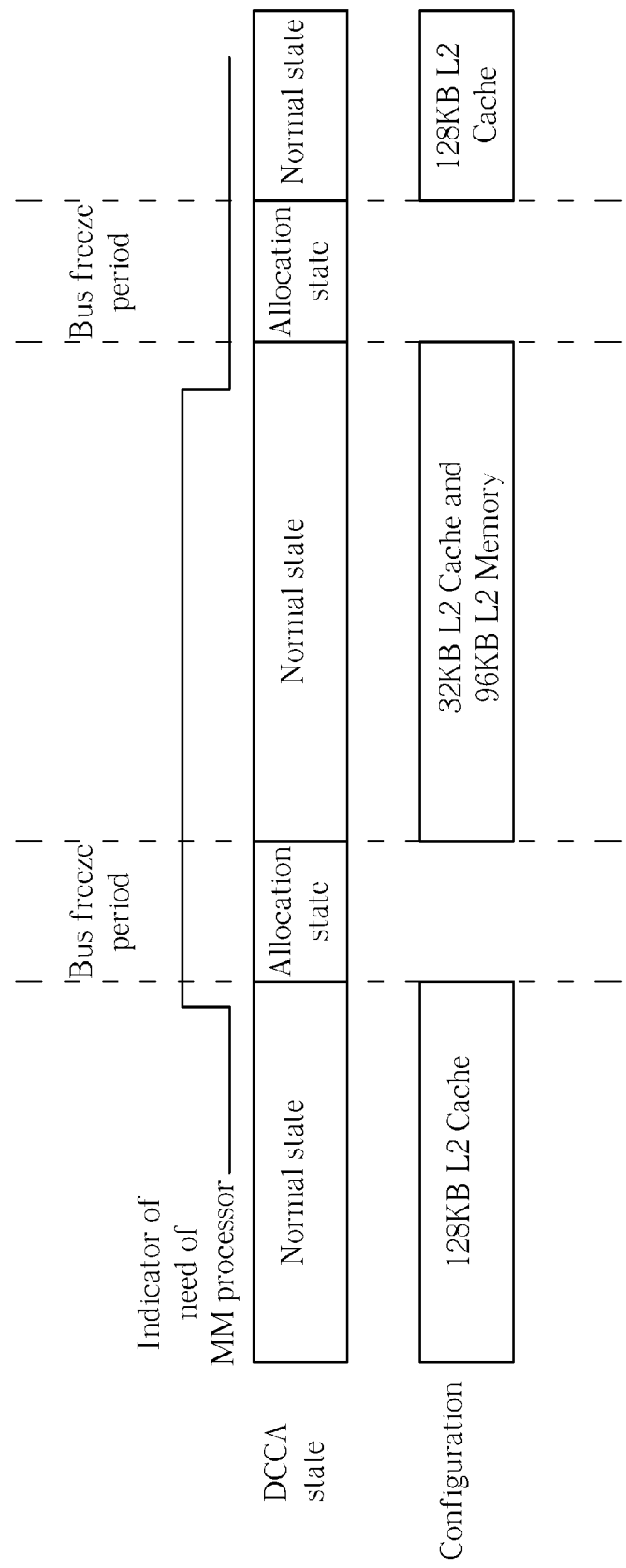
FIG. 8 illustrates a timing diagram of some dynamic configurable cache architecture (DCCA) states and associated configurations involved with the method shown in FIG. 2 according to an embodiment of the present invention.

FIG. 8 illustrates a timing diagram of some DCCA states and associated configurations involved with the method 200 shown in FIG. 2 according to an embodiment of the present invention. According to this embodiment, the memory banks BK0, BK1, BK2, and BK3 disclosed above can be taken as examples of the memory banks 122-1, 122-2, . . . , and 122-M mentioned above (more particularly, the memory banks 122-1, 122-2, 122-3, and 122-4), respectively. For example, the size of each of the memory banks BK0, BK1, BK2, and BK3 can be equal to 32 KB.

As shown in FIG. 8, the uppermost curve is an indicator of the need of the MM processor 516, where the low state of the indicator can represent that the MM processor 516 does not need a memory space/additional space, and the high state of the indicator can represent that the MM processor 516 needs a memory space/additional space. Regarding the DCCA states shown in FIG. 8, the DCCA may switch between a plurality of states such as a normal state and an allocation state. For example, the dynamic configurable cache controller 124 can control the DCCA to be in the normal state by default, and the associated configuration "128 KB L2 Cache" indicates that all of the 128 KB memory space of the memory banks BK0, BK1, BK2, and BK3 is utilized as a L2 cache by the GPU 512. When the indicator of the need of the MM processor 516 enters the high state thereof, the dynamic configurable cache controller 124 is capable of determining the timing of switching into another configuration (of the dynamic configurable cache 520) to be a little bit later, so a first bus freeze period (i.e. the bus freeze period illustrated in the left half of FIG. 8) begins at a time point that is a little bit later than the transition (e.g. the rising edge) of the indicator. As a result, the dynamic configurable cache controller 124 is capable of controlling the DCCA to enter the allocation state during the first bus freeze period, in order to change the configuration of the dynamic configurable cache 520 based upon the method 200.

After the first bus freeze period comes to an end, the dynamic configurable cache controller 124 is capable of controlling the DCCA to be in the normal state again, and the associated configuration "32 KB L2 Cache and 96 KB L2 Memory" indicates that 32 KB memory space of the memory banks BK0, BK1, BK2, and BK3 (e.g. the memory space of the GPU-dedicated memory bank such as the memory banks BK0) is utilized as a L2 cache by the GPU 512, and further indicates that 96 KB memory space of the memory banks BK0, BK1, BK2, and BK3 (e.g. the memory space of some other memory banks such as the memory banks BK1, BK2, and BK3) is utilized as a L2 memory by the MM processor 516. When the indicator of the need of the MM processor 516 enters the low state thereof, the dynamic configurable cache controller 124 is capable of determining the timing of switching into another configuration (of the dynamic configurable cache 520) to be a little bit later, so a second bus freeze period (i.e. the bus freeze period illustrated in the right half of FIG. 8) begins at a time point that is a little bit later than the transition (e.g. the falling edge) of the indicator. As a result, the dynamic configurable cache controller 124 is capable of controlling the DCCA to enter the allocation state during the second bus freeze period, in order to change the configuration of the dynamic configurable cache 520 based upon the method 200.

After the second bus freeze period comes to an end, the dynamic configurable cache controller 124 is capable of controlling the DCCA to be in the normal state again, and the associated configuration "128 KB L2 Cache" indicates that all of the 128 KB memory space of the memory banks BK0, BK1, BK2, and BK3 is utilized as a L2 cache by the GPU 512. Similar descriptions are not repeated in detail for this embodiment.

According to a variation of the embodiment shown in FIG. 8, after the end of the second bus freeze period, the configuration can be any configuration according to different design requirements. For example, after the end of the second bus freeze period, a portion of the memory banks 122-1, 122-2, . . . , and 122-M mentioned above (more particularly, one or more memory banks of the memory banks 122-1, 122-2, 122-3, and 122-4) can be idle, where it is unnecessary that the aforementioned portion of the memory banks 122-1, 122-2, . . . , and 122-M are utilized as a cache again. Similar descriptions are not repeated in detail for this variation.

It is an advantage of the present invention that the present invention method and apparatus provide hardware release/allocation control of the dynamic configurable cache to carry out the DCCA, where no software synchronization penalty is introduced. In addition, the dynamic configurable cache controller can determine the timing of switching between different configurations of the dynamic configurable cache in run time. Additionally, the L2 cache implemented according to the DCCA can be a user-transparent memory system (i.e. a memory system that the user is aware of), and therefore, can serve the end user well when needed. As a result of utilizing the DCCA according to any of the embodiments/variations disclosed above, an electronic device can be equipped with a processor having higher capability/power, and more particularly, can be equipped with a multi-core processor or multiple processors, without omitting the compact requirement mentioned above and can have the cache/memory be efficiently utilized.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing dynamic configuration, the method comprising:
    freezing a bus between a dynamic configurable cache and a plurality of cores/processors by rejecting a request from any of the cores/processors during a bus freeze period, wherein the dynamic configurable cache is implemented with an on-chip memory; and
    adjusting a size of a portion of the dynamic configurable cache during the bus freeze period, wherein the portion of the dynamic configurable cache is configured to cache/store information for one of the cores/processors.

2. The method of claim 1, wherein the on-chip memory comprises a plurality of memory banks; and the portion of the dynamic configurable cache comprises at least one memory bank of the memory banks.

3. The method of claim 1, the step of freezing the bus between the dynamic configurable cache and the plurality of cores/processors by rejecting the request from any of the cores/processors during the bus freeze period further comprises:
    freezing the bus in response to a request from a core/processor of the cores/processors.

4. The method of claim 3, wherein the request asks for allocating an additional space of the dynamic configurable cache for the core/processor submitting the request.

5. The method of claim 4, further comprising:
    re-freezing the bus in response to a notification from the core/processor submitting the request, in order to free the additional space, wherein the notification indicates that the additional space is not required.

6. The method of claim 1, further comprising:
    controlling beginning of the bus freeze period to be aligned to a time point of frame change.

7. The method of claim 1, further comprising:
    controlling beginning of the bus freeze period to be delayed for a predetermined delay amount.

8. The method of claim 1, further comprising:
    after an operation of adjusting the size of the portion of the dynamic configurable cache is completed, controlling the bus freeze period to come to an end.

9. The method of claim 1, wherein the portion of the dynamic configurable cache is temporarily utilized as a cache.

10. The method of claim 1, wherein the portion of the dynamic configurable cache is temporarily utilized as a scratch pad memory.

11. An apparatus for performing dynamic configuration, the apparatus comprising:
    a plurality of cores/processors capable of performing operations of the apparatus;
    a dynamic configurable cache configured to cache/store information for the cores/processors, wherein the dynamic configurable cache is implemented with an on-chip memory; and
    a dynamic configurable cache controller configured to freeze a bus between the dynamic configurable cache and the plurality of cores/processors by rejecting a request from any of the cores/processors during a bus freeze period, and adjusting a size of a portion of the dynamic configurable cache during the bus freeze period.

12. The apparatus of claim 11, wherein the on-chip memory comprises a plurality of memory banks; and the portion of the dynamic configurable cache comprises at least one memory bank of the memory banks.

13. The apparatus of claim 11, wherein the dynamic configurable cache controller is further configured to freeze the bus in response to a request from a core/processor of the cores/processors.

14. The apparatus of claim 13, wherein the request asks for allocating an additional space of the dynamic configurable cache for the core/processor submitting the request.

15. The apparatus of claim 14, wherein the dynamic configurable cache controller is further configured to re-freeze the bus in response to a notification from the core/processor submitting the request, in order to free the additional space; and the notification indicates that the additional space is not required.

16. The apparatus of claim 11, wherein the dynamic configurable cache controller is further configured to control beginning of the bus freeze period to be aligned to a time point of frame change.

17. The apparatus of claim 11, wherein the dynamic configurable cache controller is further configured to control beginning of the bus freeze period to be delayed for a predetermined delay amount.

18. The apparatus of claim 11, wherein after an operation of adjusting the size of the portion of the dynamic configurable cache is completed, the dynamic configurable cache controller is further configured to control the bus freeze period to come to an end.

19. The apparatus of claim 11, wherein the portion of the dynamic configurable cache is temporarily utilized as a cache.

20. The apparatus of claim 11, wherein the portion of the dynamic configurable cache is temporarily utilized as a scratch pad memory.

21. The method of claim 1, further comprising:
    dynamically controlling the beginning of the bus freeze period.

22. The apparatus of claim 11, wherein the dynamic configurable cache controller is configured to dynamically control the beginning of the bus freeze period.

* * * * *